United States Patent
Kawamura (10) Patent No.: US 10,644,490 B2
(45) Date of Patent: May 5, 2020

(54) LIQUID-PROOF STRUCTURE OF FITTING BODY, ELECTRICAL CONNECTION BOX, AND WIRE HARNESS

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/431,042

(22) Filed: Jun. 4, 2019

(65) Prior Publication Data

US 2019/0379191 A1    Dec. 12, 2019

(30) Foreign Application Priority Data

Jun. 7, 2018   (JP) .................. 2018-109345

(51) Int. Cl.
*H02G 3/14* (2006.01)
*H02G 3/16* (2006.01)
*H02G 3/08* (2006.01)

(52) U.S. Cl.
CPC ............. *H02G 3/088* (2013.01); *H02G 3/083* (2013.01); *H02G 3/14* (2013.01); *H02G 3/16* (2013.01)

(58) Field of Classification Search
CPC .......... H02G 3/088; H02G 3/083; H02G 3/14; H02G 3/16
USPC ....................................................... 174/563
See application file for complete search history.

(56) References Cited

U.S. PATENT DOCUMENTS

| | | | |
|---|---|---|---|
| 6,953,126 B2 * | 10/2005 | Parker ................. | A45C 13/008 220/4.22 |
| 7,077,281 B2 * | 7/2006 | Sato ....................... | H02G 3/088 220/3.8 |
| 10,326,262 B2 * | 6/2019 | Kiyota ..................... | H05K 5/06 |
| 2010/0307814 A1 * | 12/2010 | Aoki .................... | B60R 16/0238 174/520 |
| 2012/0073851 A1 | 3/2012 | Takeuchi et al. | |
| 2012/0097693 A1 * | 4/2012 | Takeuchi ............ | B60R 16/0239 220/810 |

(Continued)

FOREIGN PATENT DOCUMENTS

| EP | 2 234 231 A1 | 9/2010 |
|---|---|---|
| EP | 2 879 254 A1 | 6/2015 |

(Continued)

*Primary Examiner* — Timothy J Thompson
*Assistant Examiner* — Michael F McAllister
(74) *Attorney, Agent, or Firm* — Kenealy Vaidya LLP (57) ABSTRACT

A liquid-proof structure includes: a first opening periphery part formed on the inside of a first fitting member; a second opening periphery part formed on the outside of the first fitting member; an opening periphery part of a second fitting member fitted to the first fitting member, the opening periphery part being fitted to a gap between the first opening periphery part and the second opening periphery part; and a buffer part defined between an inner wall surface of the second opening periphery part and an outer wall surface of the opening periphery part while the first fitting member and the second fitting member are being fitted. The buffer part is a space part defined by a concave part provided on at least one of the inner wall surface of the second opening periphery part and the outer wall surface of the opening periphery part.

7 Claims, 5 Drawing Sheets

(56) References Cited

U.S. PATENT DOCUMENTS

2016/0141131 A1* 5/2016 Kawamura .............. H01R 9/24
335/202

FOREIGN PATENT DOCUMENTS

| JP | 2010-285184 A | 12/2010 |
| JP | 2010-288371 A | 12/2010 |

* cited by examiner

LIQUID-PROOF STRUCTURE OF FITTING BODY, ELECTRICAL CONNECTION BOX, AND WIRE HARNESS

CROSS-REFERENCE TO RELATED APPLICATION(S)

The present application claims priority to and incorporates by reference the entire contents of Japanese Patent Application No. 2018-109345 filed in Japan on Jun. 7, 2018.

BACKGROUND OF THE INVENTION

1. Field of the Invention

The present invention relates to a liquid-proof structure of a fitting body, an electrical connection box, and a wire harness.

2. Description of the Related Art

Conventionally, a fitting body in which a plurality of fitting members are fitted to each other has been known. For example, the fitting body may be formed as a housing that includes therein a storage chamber. The fitting body may be used as a housing of an electrical connection box that stores therein electronic components, a housing of an electrical connection box that stores therein electronic components and an electrical wire and that configures a wire harness with the electric wire drawn out to the outside, and the like. Japanese Patent Application Laid-open No. 2010-285184 and Japanese Patent Application Laid-open No. 2010-288371 disclose such a fitting body. The fitting body disclosed in Japanese Patent Application Laid-open No. 2010-285184 and Japanese Patent Application Laid-open No. 2010-288371 includes an upper cover serving as one of fitting members, and a box main body serving as the other fitting member fitted to the upper cover. A double-wall part that includes therein a space part is provided at two locations of the upper cover. The double-wall part includes an opening disposed opposite to the box main body in a fitting direction with the box main body. The space part in the double-wall part is defined as a buffer part for suppressing the force of entered water, when the opening is closed by the box main body while the upper cover and the box main body are being fitted.

In a conventional liquid-proof structure of a fitting body, the double-wall part is provided for each buffer part, and each of the double-wall parts is shifted in the orthogonal direction with respect to the fitting direction. Thus, the size of the fitting body may increase in the orthogonal direction.

SUMMARY OF THE INVENTION

Consequently, an object of the present invention is to provide a liquid-proof structure of a fitting body, an electrical connection box, and a wire harness that can suppress increase in the size of the fitting body and can enhance the liquid-proof property.

A liquid-proof structure of a fitting body according to one aspect of the present invention includes a first opening periphery part formed on an inside of a first fitting member; a second opening periphery part formed on an outside of the first fitting member; an opening periphery part of a second fitting member fitted to the first fitting member, the opening periphery part being fitted to a gap between the first opening periphery part and the second opening periphery part; and a buffer part defined between an inner wall surface of the second opening periphery part and an outer wall surface of the opening periphery part while the first fitting member and the second fitting member are being fitted, wherein the buffer part is a space part defined by a concave part provided on at least one of the inner wall surface of the second opening periphery part and the outer wall surface of the opening periphery part.

According to another aspect of the present invention, it is preferable that the liquid-proof structure of the fitting body further includes a clearance part narrower than a gap between the inner wall surface of the second opening periphery part and the outer wall surface of the opening periphery part of the buffer part, at a side on an opening of the second opening periphery part than the buffer part between the inner wall surface of the second opening periphery part and the outer wall surface of the opening periphery part.

According to still another aspect of the present invention, in the liquid-proof structure of the fitting body, it is preferable that the buffer part is a space part surrounded by an outside concave part provided on the inner wall surface of the second opening periphery part and an inside concave part provided on the outer wall surface of the opening periphery part.

According to still another aspect of the present invention, in the liquid-proof structure of the fitting body, it is preferable that the second opening periphery part includes an outside base part disposed opposite to a whole or a part of an outer wall surface of the first opening periphery part in a fitting direction of the first and second fitting members, and an outside thin wall part that forms the outside concave part with an inner wall surface dent more than an inner wall surface of the outside base part at a side on an opening of the second opening periphery part than the outside base part, and the opening periphery part includes an inside base part and an inside thin wall part that forms the inside concave part with an outer wall surface dent more than an outer wall surface of the inside base part at a side on an opening of the opening periphery part than the inside base part.

According to still another aspect of the present invention, in the liquid-proof structure of the fitting body, it is preferable that the outside thin wall part is a portion in which an inner wall surface that is placed at the side on the opening of the second opening periphery part than the outside base part and that is not beyond an opening side end surface of the second opening periphery part is dented more than the inner wall surface of the outside base part, and forms: a first outside concave part serving as the outside concave part; and a second outside concave part that is placed at the side on the opening of the second opening periphery part than the first outside concave part and that is not beyond the opening side end surface of the second opening periphery part, and the inside thin wall part is a portion in which an outer wall surface that is placed at the side on the opening of the opening periphery part than the inside base part and that is not beyond the opening side end surface of the opening periphery part is dented more than the outer wall surface of the inside base part; and forms a first inside concave part serving as the inside concave part and a second inside concave part that is placed at the side on the opening of the opening periphery part than the first inside concave part and that is not beyond the opening side end surface of the opening periphery part.

According to still another aspect of the present invention, in the liquid-proof structure of the fitting body, it is preferable that when the first and second fitting members are being fitted, an inner wall surface of the second outside concave part of the outside thin wall part and the outer wall surface of the inside base part are disposed opposite to each other, and in the opening periphery part, by providing a thin wall part in which an outer wall surface is dented more than the outer wall surface of the inside base part at a side opposite to the inside thin wall part interposing the inside base part therebetween, the inside base part is formed in a convex shape projected from the outer wall surfaces of the inside thin wall part and the thin wall part.

An electrical connection box according to still another aspect of the present invention includes a housing that stores therein an electronic component, wherein the housing includes: a liquid-proof structure that includes at least one of first and second fitting members fitted to each other and that maintains a liquid-proof property of a fitted portion of the first and second fitting members, the liquid-proof structure includes: a first opening periphery part formed on an inside of the first fitting member; a second opening periphery part formed on an outside of the first fitting member, an opening periphery part of the second fitting member, being fitted to a gap between the first opening periphery part and the second opening periphery part; and a buffer part defined between an inner wall surface of the second opening periphery part and an outer wall surface of the opening periphery part while the first fitting member and the second fitting member are being fitted, and the buffer part is a space part defined by a concave part provided on at least one of the inner wall surface of the second opening periphery part and the outer wall surface of the opening periphery part.

A wire harness according to still another aspect of the present invention includes an electronic component; an electric wire electrically connected to the electronic component; and a housing that stores therein the electronic component and the electric wire, and from which the electric wire is drawn from inside to outside, wherein the housing includes a liquid-proof structure that includes at least one of first and second fitting members fitted to each other, and that maintains a liquid-proof property of a fitted portion of the first and second fitting members, the liquid-proof structure includes: a first opening periphery part formed on an inside of the first fitting member; a second opening periphery part formed on an outside of the first fitting member; an opening periphery part of the second fitting member, being fitted to a gap between the first opening periphery part and the second opening periphery part; and a buffer part defined between an inner wall surface of the second opening periphery part and an outer wall surface of the opening periphery part while the first fitting member and the second fitting member are being fitted, and the buffer part is a space part defined by a concave part provided on at least one of the inner wall surface of the second opening periphery part and the outer wall surface of the opening periphery part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a liquid-proof structure of a fitting body, an electrical connection box, and a wire harness according to the present invention will be described in detail with reference to the accompanying drawings. It is to be understood that this invention is not limited to the embodiment.

Embodiment

An embodiment of a liquid-proof structure of a fitting body, an electrical connection box, and a wire harness according to the present invention will now be described with reference to FIG. 1 to FIG. 5.

A reference numeral 1 in FIG. 1 to FIG. 4 indicates a liquid-proof structure of a fitting body according to the present embodiment. The fitting body is a structural body in which at least two fitting members are fitted to each other. The liquid-proof structure 1 is a structure for maintaining the liquid-proof property of the fitted portion of the two fitting members, and is provided so as to prevent liquid from entering space in the fitting body from the outside at the fitted portion.

Figure 2:
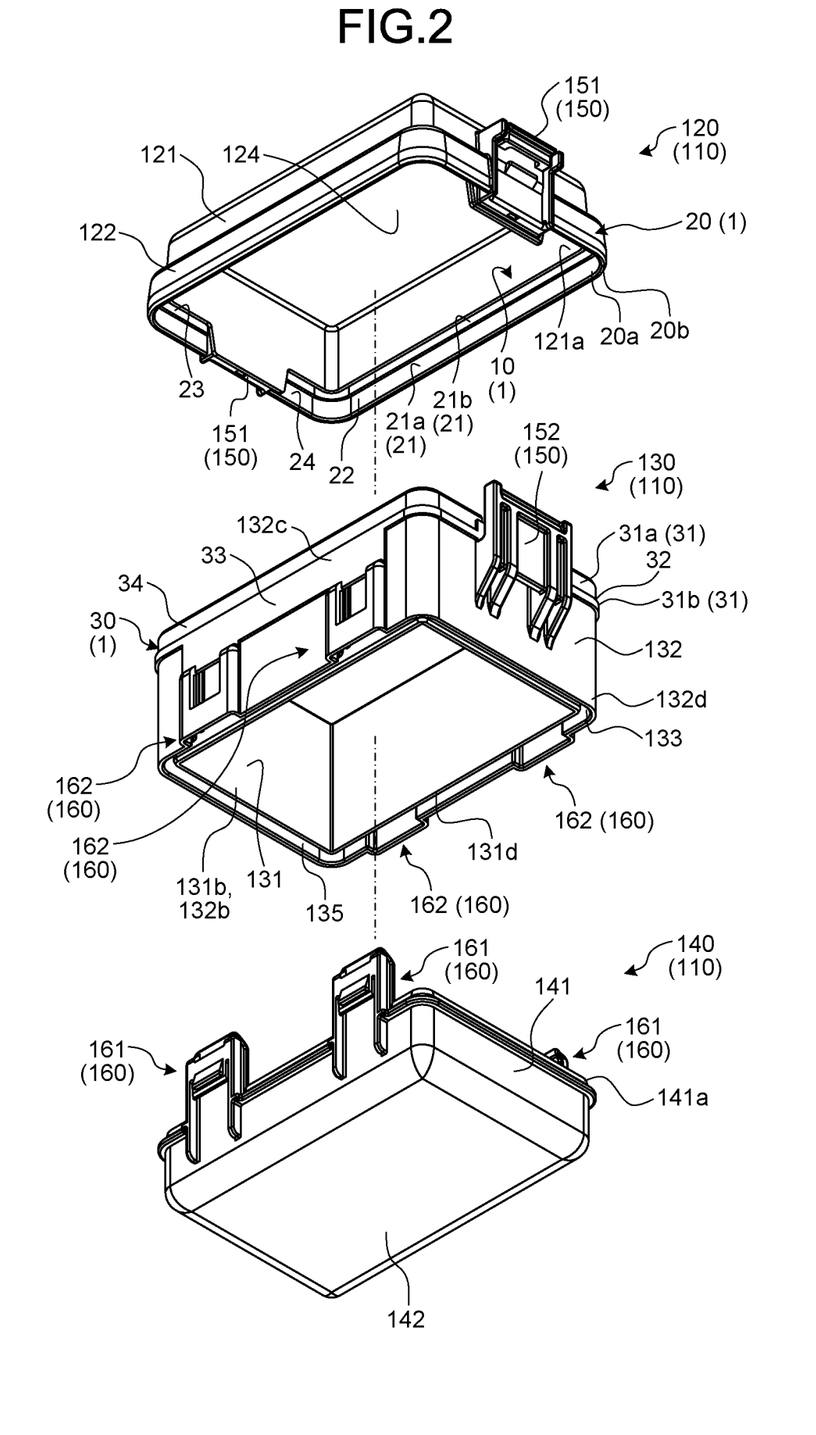
FIG. 2 is an exploded perspective view of the liquid-proof structure and the housing of the electrical connection box of the embodiment viewed from another angle.
Figure 3:
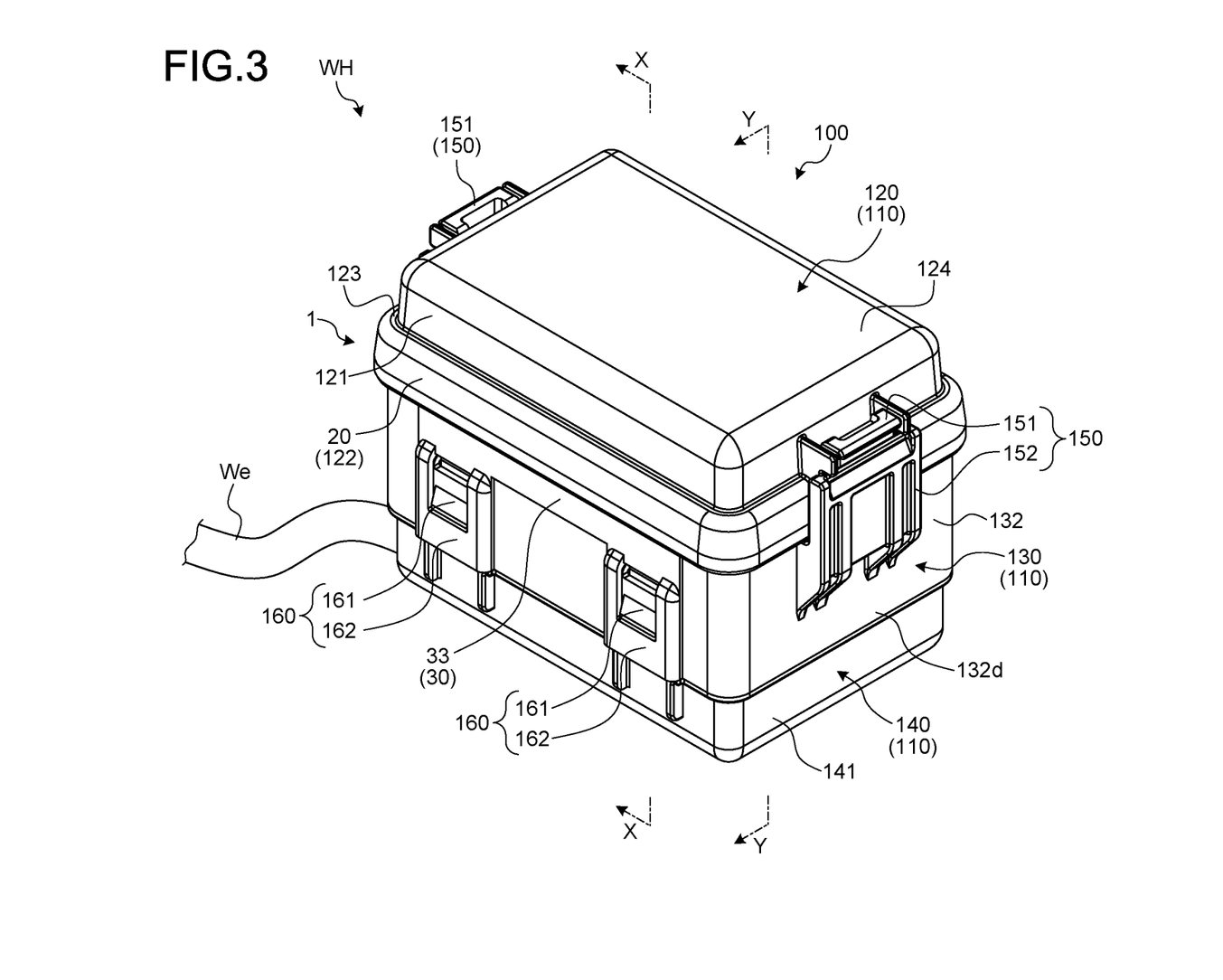
FIG. 3 is a perspective view illustrating an electrical connection box and a wire harness applied with the liquid-proof structure of the embodiment.

The liquid-proof structure 1 of the present embodiment is used to maintain the liquid-proof property of a fitting body formed as a housing 110 of an electrical connection box 100 (FIG. 3). The liquid-proof structure 1 of the present embodiment is configured so as to prevent liquid from entering the storage chamber in the housing 110. The liquid-proof structure 1 includes a first opening periphery part 10 (FIG. 2 and FIG. 4) formed on the inside of a first fitting member 120 and a second opening periphery part 20 (FIG. 1 to FIG. 4) formed on the outside of the first fitting member 120, which will be described below. The liquid-proof structure 1 also includes an opening periphery part 30 (FIG. 1 and FIG. 4) of a second fitting member 130 fitted to the first fitting member 120, the opening periphery part 30 being fitted to a gap between the first opening periphery part 10 and the second opening periphery part 20. The liquid-proof structure 1 further includes a buffer part 40 (FIG. 4) defined between the inner wall surface of the second opening periphery part 20 and the outer wall surface of the opening periphery part 30, when the first fitting member 120 and the second fitting member 130 are being fitted.

The buffer part 40 is a space part defined by a concave part provided on at least one of an inner wall surface 21 of the second opening periphery part 20 and an outer wall surface 31 of the opening periphery part 30. The buffer part 40 suppresses the force of liquid, when the liquid enters from the outside of the fitting body. In the liquid-proof structure 1, the buffer part 40 is defined by the concave part provided on at least one of the inner wall surface 21 of the second opening periphery part 20 and the outer wall surface 31 of the opening periphery part 30. Consequently, it is possible to suppress increase in the size of the first opening periphery part 10, the second opening periphery part 20, and the opening periphery part 30 in the orthogonal direction, with respect to the cylinder axis directions. In other words, this liquid-proof structure 1 can suppress increase in the size of the fitting body and can enhance the liquid-proof property. Hereinafter, the liquid-proof structure 1 will be described with the electrical connection box 100.

The electrical connection box 100 is a structure that stores therein electronic components, or a structure that stores therein electronic components and an electric wire and that configures a wire harness with the electric wire drawn out to the outside. In this example, the electrical connection box 100, which is a component of a wire harness WH (FIG. 3), is used as an example. The electrical connection box 100 includes the housing 110 that stores therein electronic components (not illustrated). The housing 110 in this example also stores therein an electric wire We electrically connected to the electronic components in the housing 110, and the electric wire We is drawn from inside to outside (FIG. 3). In the electrical connection box 100, an object to be connected (not illustrated) is electrically connected to each of the electronic components via the electric wire We. In the electrical connection box 100, the electronic component is electrically connected to the object to be connected via the electric wire We that is drawn out from the inside of the housing 110 to the outside.

For example, the electronic component refers to a circuit protection component such as a relay and a fuse, a connector, a terminal metal fitting, and the like. In this example, a circuit substrate and an electronic device such as an electronic control unit (what is called an ECU) are also considered as a form of electronic component. Moreover, the object to be connected refers to a power source such as a secondary battery, load such as an electrical apparatus (such as an actuator), a sensor, and the like. In the electrical connection box 100, for example, a certain electric wire We is electrically connected to the power source, and another electric wire We is electrically connected to the load. The power source and the load are electrically joined via the electronic components.

Figure 1:
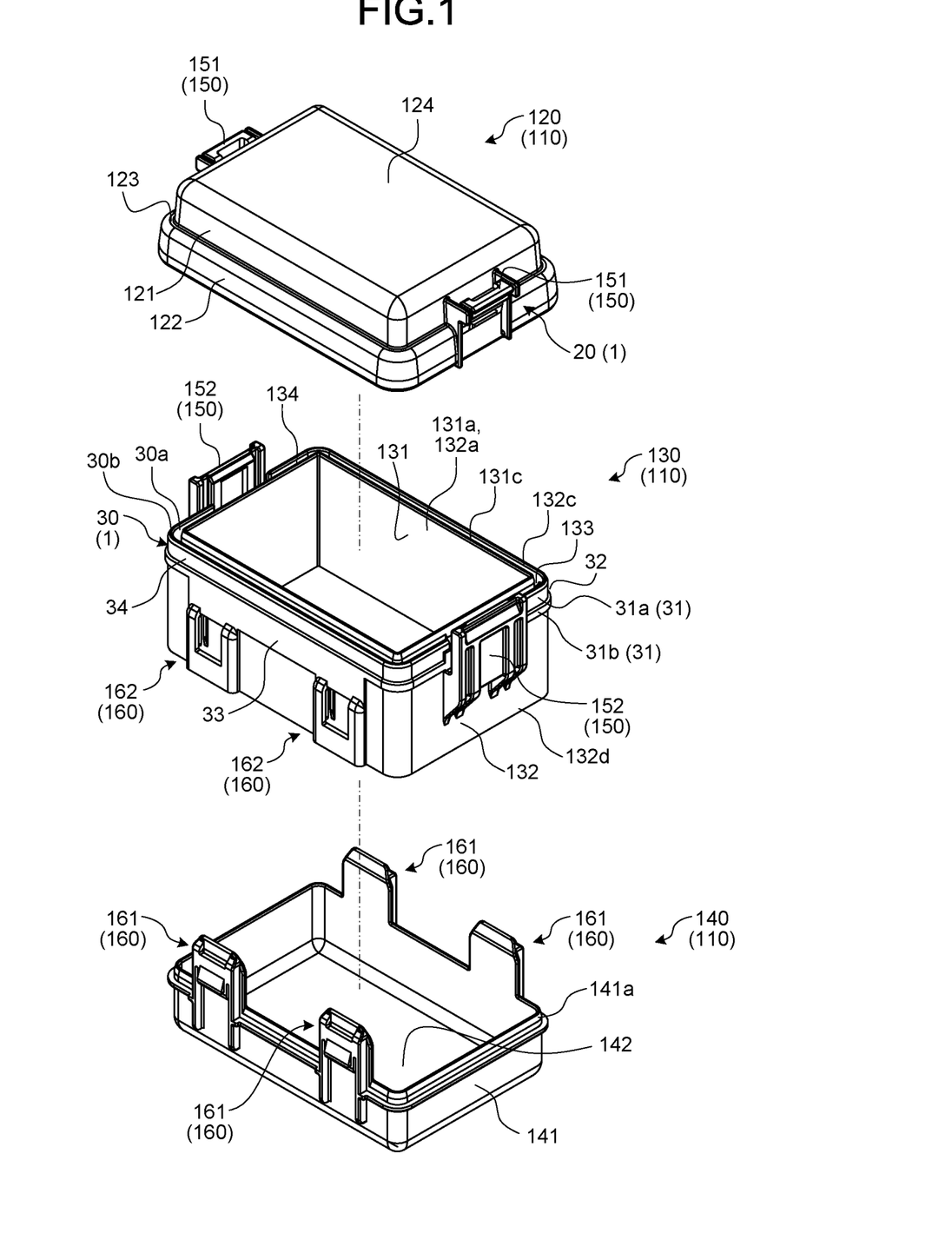
FIG. 1 is an exploded perspective view of a liquid-proof structure and a housing of an electrical connection box of an embodiment.

The housing 110 is formed of an insulation material such as synthetic resin. The housing 110 includes at least the first and second fitting members 120 and 130 that are fitted to each other, and the liquid-proof structure 1 for maintaining the liquid-proof property of the fitted portion of the first and second fitting members 120 and 130 (FIG. 1 to FIG. 4). The housing 110 in this example further includes a third fitting member 140 (FIG. 1 to FIG. 3). In the housing 110, the first fitting member 120, the second fitting member 130, and the third fitting member 140 are arranged in this order. In the housing 110, the first fitting member 120 and the second fitting member 130 are fitted to each other, and the second fitting member 130 and the third fitting member 140 are fitted to each other.

In the housing 110 in this example, the second fitting member 130 in the middle is formed in a cylindrical shape. An opening at one side of the second fitting member 130 is closed by the first fitting member 120, and an opening at the other side of the second fitting member 130 is closed by the third fitting member 140. In this example, the second fitting member 130 is the main frame of the housing 110, and the first fitting member 120 and the third fitting member 140 are covering materials for closing the openings of the second fitting member 130. For example, the housing 110 is mounted on a vehicle while directing the two openings of the second fitting member 130 disposed opposite to each other in the vehicle vertical direction. The first fitting member 120 and the third fitting member 140 may either be a lower cover or an upper cover. In this example, for convenience sake, the first fitting member 120 is used as the upper cover, and the third fitting member 140 is used as the lower cover.

The second fitting member 130 includes a first peripheral wall body 131 that forms the inner wall and that is formed in a cylindrical shape, and a second peripheral wall body 132 that forms the outer wall and that is formed in a cylindrical shape (FIG. 1 and FIG. 2). The first peripheral wall body 131 and the second peripheral wall body 132 are structures in which a plurality of plate-shaped wall bodies of the same number are arranged and joined in the circumferential direction. The second fitting member 130 is formed in a double-wall structural body in which the first peripheral wall body 131 and the second peripheral wall body 132 are arranged so as the cylinder axis directions of which are aligned in the same direction. The wall bodies of the first peripheral wall body 131 and the second peripheral wall body 132 are disposed opposite to each other at an interval. Consequently, in the second fitting member 130, a space part 133 having a cylindrical shape (hereinafter, referred to as a "cylindrical space part") is defined between the first peripheral wall body 131 and the second peripheral wall body 132 (FIG. 1 and FIG. 2). Moreover, in the second fitting member 130, a single or a plurality of storage chambers are defined in the first peripheral wall body 131, and the electronic components and the electric wire We are housed in the storage chamber.

The first peripheral wall body 131 includes two openings 131*a* and 131*b* disposed opposite to each other (FIG. 1 and FIG. 2). Moreover, the second peripheral wall body 132 includes two openings 132*a* and 132*b* disposed opposite to each other (FIG. 1 and FIG. 2). In the second fitting member 130, a periphery part (hereinafter, referred to as an "opening periphery part") 131*c* of the opening 131*a* on one side of the first peripheral wall body 131, and a periphery part (hereinafter, referred to as an "opening periphery part") 132*c* of the opening 132*a* on one side of the second peripheral wall body 132 are disposed opposite to each other at an interval (FIG. 1). Consequently, in the second fitting member 130, the opening 131*a* on one side of the first peripheral wall body 131, and an annular opening 134 between the opening periphery parts 131*c* and 132*c* on one side of the first peripheral wall body 131 are openings to be closed by the first fitting member 120 (FIG. 1). In the second fitting member 130, the opening periphery part 132*c* on one side of the second peripheral wall body 132 is used as the opening periphery part 30 of the liquid-proof structure 1. Moreover, in the second fitting member 130, a periphery part (hereinafter, referred to as an "opening periphery part") 131*d* of the opening 131*b* on the other side of the first peripheral wall body 131 and a periphery part (hereinafter, referred to as an "opening periphery part") 132*d* of the opening 132*b* on the other side of the second peripheral wall body 132 are disposed opposite to each other at an interval (FIG. 2). Consequently, in the second fitting member 130, the opening 131*b* on the other side of the first peripheral wall body 131 and the annular opening 135 between the opening periphery parts 131*d* and 132*d* on the other side of the first peripheral wall body 131 are openings to be closed by the third fitting member 140 (FIG. 2).

The first fitting member 120 includes a cylinder main peripheral wall body 121, a cylinder sub-peripheral wall body 122, a coupling wall body 123 that couples the main peripheral wall body 121 and the sub-peripheral wall body 122, and a closing body 124 that closes one of the openings of the main peripheral wall body 121 (FIG. 1 and FIG. 3).

In each of the main peripheral wall body 121 and the sub-peripheral wall body 122, a plurality of plate-shaped wall bodies arranged and joined in the circumferential direction are disposed corresponding to a plurality of plate-shaped wall bodies in the first peripheral wall body 131 and the second peripheral wall body 132. The main peripheral wall body 121 and the sub-peripheral wall body 122 are formed in double-wall structural bodies the cylinder axis directions of which are aligned in the same direction. The main peripheral wall body 121 and the sub-peripheral wall body 122 are disposed opposite to each other at an interval.

Figure 4:
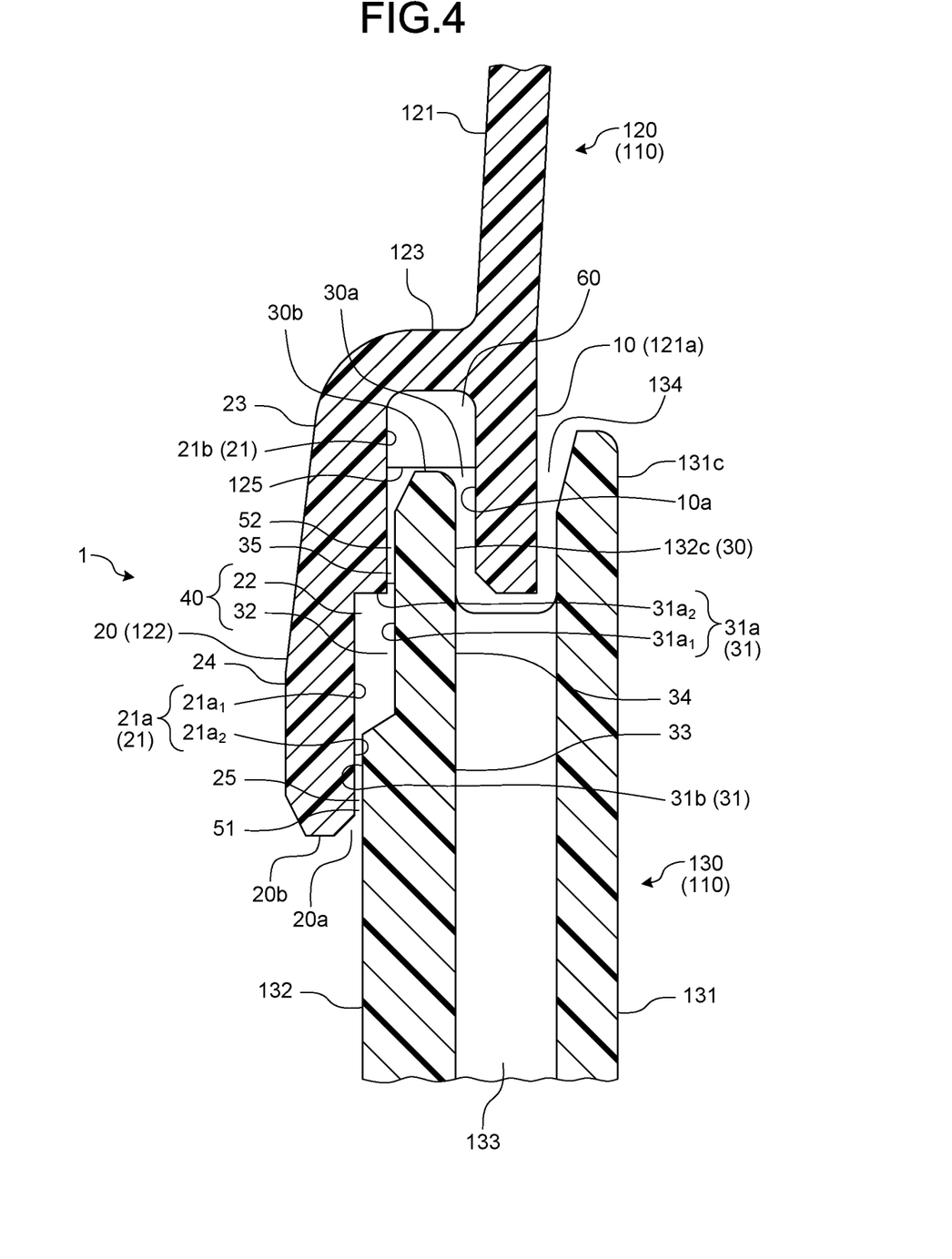
FIG. 4 is a sectional view cut along a line X-X in FIG. 3, and a partial enlarged view of the liquid-proof structure.

The main peripheral wall body 121 includes a periphery part (hereinafter, referred to as an "opening periphery part") 121a of the other opening used as the first opening periphery part 10 formed on the inside of the liquid-proof structure 1 (FIG. 2 and FIG. 4). The sub-peripheral wall body 122 is disposed opposite to the outer wall surface of the opening periphery part 121a (first opening periphery part 10) at an interval. In the first fitting member 120, the sub-peripheral wall body 122 is used as the second opening periphery part 20 formed on the outside of the liquid-proof structure 1. Consequently, the sub-peripheral wall body 122 is coupled to the outer wall surface of the main peripheral wall body 121 via the coupling wall body 123, at a side closer to the closing body 124 than the opening periphery part 121a (first opening periphery part 10) of the main peripheral wall body 121. The coupling wall body 123 is an annular wall body projected from the outer wall surface of the main peripheral wall body 121. The coupling wall body 123 in this example is placed vertically on the outer wall surface of the main peripheral wall body 121. The sub-peripheral wall body 122 is coupled to an end part of the coupling wall body 123 at the projection direction side.

The opening periphery part 121a (first opening periphery part 10) of the main peripheral wall body 121 is inserted into the cylindrical space part 133 from the opening 134 of the second fitting member 130, and is fitted to a gap between the opening periphery part 131c and the opening periphery part 132c (opening periphery part 30) of the second fitting member 130. While the opening periphery part 121a is fitted to the gap, the opening periphery part 132c (opening periphery part 30) is fitted to a gap between the opening periphery part 121a (first opening periphery part 10) and the sub-peripheral wall body 122 (second opening periphery part 20).

The third fitting member 140 includes a cylinder peripheral wall body 141 and a closing body 142 that closes the opening on one side of the peripheral wall body 141 (FIG. 1 and FIG. 2). In the peripheral wall body 141, a plurality of plate-shaped wall bodies arranged and joined in the circumferential direction are disposed corresponding to a plurality of plate-shaped wall bodies in the first peripheral wall body 131 and the second peripheral wall body 132. In the third fitting member 140, a periphery part (hereinafter, referred to as an "opening periphery part") 141a (FIG. 1 and FIG. 2) of the opening on the other side of the peripheral wall body 141 is inserted into the cylindrical space part 133 from the opening 135 of the second fitting member 130. Consequently, the opening periphery part 141a is fitted to a gap between the opening periphery part 131d and the opening periphery part 132d of the second fitting member 130.

In the housing 110 in this example, the liquid-proof structure 1 is provided between the first fitting member 120 and the second fitting member 130. However, the liquid-proof structure 1 may also be provided between the second fitting member 130 and the third fitting member 140.

As described above, the liquid-proof structure 1 in this example includes the first opening periphery part 10 (opening periphery part 121a) of the first fitting member 120, the second opening periphery part 20 (sub-peripheral wall body 122) of the first fitting member 120, the opening periphery part 30 (opening periphery part 132c) of the second fitting member 130, and the buffer part 40 between the second opening periphery part 20 and the opening periphery part 30 (FIG. 4).

Moreover, in the liquid-proof structure 1 in this example, a clearance part (hereinafter, referred to as a "first clearance part") 51 that is narrower than the gap between the inner wall surface 21 of the second opening periphery part 20 and the outer wall surface 31 of the opening periphery part 30 of the buffer part 40 is provided at the side on an opening 20a (FIG. 2) of the second opening periphery part 20 than the buffer part 40 between the inner wall surface 21 of the second opening periphery part 20 and the outer wall surface 31 of the opening periphery part 30 (FIG. 4). The first clearance part 51 is an annular gap for reducing the amount of liquid entering from the outside of the fitting body. Consequently, the first clearance part 51 is defined as a minute gap capable of preventing liquid from entering from outside. In the liquid-proof structure 1 in this example, the first clearance part 51 is communicated to the buffer part 40. Consequently, the amount of liquid entering the buffer part 40 is reduced, by suppressing the liquid from entering from the opening 20a side by the first clearance part 51. Thus, in the liquid-proof structure 1, it is preferable to provide such a first clearance part 51 to prevent liquid from entering the space in the fitting body.

Furthermore, in the liquid-proof structure 1 in this example, a clearance part (hereinafter, referred to as a "second clearance part") 52 that is narrower than the gap between the inner wall surface 21 of the second opening periphery part 20 and the outer wall surface 31 of the opening periphery part 30 of the buffer part 40 is provided at the side on an opening 30a (FIG. 1) of the opening periphery part 30 than the buffer part 40 between the inner wall surface 21 of the second opening periphery part 20 and the outer wall surface 31 of the opening periphery part 30 (FIG. 4). The second clearance part 52 is an annular gap that is communicated with the buffer part 40 and the cylindrical space part 133 of the second fitting member 130 and that suppresses the liquid the force of which is suppressed by the buffer part 40 from entering the cylindrical space part 133. Consequently, the second clearance part 52 is defined as a minute gap capable of suppressing such liquid from entering. The liquid-proof structure 1 in this example prevents liquid from entering the space (storage chamber in the housing 110) in the fitting body that is communicated to the cylindrical space part 133, by preventing liquid from entering the cylindrical space part 133 by the second clearance part 52. Consequently, it is preferable that the liquid-proof structure 1 is provided with the second clearance part 52 such as above to prevent liquid from entering the space in the fitting body.

Hereinafter, a specific example of the buffer part 40 included in the housing 110 in this example will be explained.

The buffer part 40 in this example is a space part surrounded by a concave part (hereinafter, referred to as an "outside concave part") 22 (FIG. 2) provided at the inner wall surface 21 of the second opening periphery part 20, and a concave part (hereinafter, referred to as an "inside concave part") 32 (FIG. 1 and FIG. 2) provided at the outer wall surface 31 of the opening periphery part 30 (FIG. 4). The outside concave part 22 is an annular concave part on the inner wall surface 21 of the second opening periphery part 20 along the circumferential direction. The inside concave part 32 is an annular concave part on the outer wall surface 31 of the opening periphery part 30 along the circumferential direction. The outside concave part 22 and the inside concave part 32 are disposed opposite to each other in the orthogonal direction with respect to the cylinder axis directions of the second opening periphery part 20 and the opening periphery part 30. The buffer part 40 may be divided into an area of the outside concave part 22 and an area of the inside concave part 32. Alternatively, the buffer part 40 may be a portion in which the area of a part of the outside concave part 22 and the area of a part of the inside concave part 32 are overlapped with each other. To form the buffer part 40, the second opening periphery part 20 and the opening periphery part 30 may be formed as follows.

The second opening periphery part 20 includes a base part (hereinafter, referred to as an "outside base part") 23 disposed opposite to the whole or a part of an outer wall surface 10*a* of the first opening periphery part 10, in the fitting direction of the first and second fitting members 120 and 130. The second opening periphery part 20 also includes a thin wall part (hereinafter, referred to as an "outside thin wall part") 24 that forms the outside concave part 22 with an inner wall surface 21*a* dent more than an inner wall surface 21*b* of the outside base part 23 at the side on the opening 20*a* of the second opening periphery part 20 than the outside base part 23 (FIG. 2 and FIG. 4). The opening periphery part 30 includes a base part (hereinafter, referred to as an "inside base part") 33, and a thin wall part (hereinafter, referred to as an "inside thin wall part") 34 that forms the inside concave part 32 with an outer wall surface 31*a* dent more than the outer wall surface 31*b* of the inside base part 33 at the side on the opening 30*a* of the opening periphery part 30 than the inside base part 33 (FIG. 1, FIG. 2, and FIG. 4).

In the second opening periphery part 20 in this example, the inner wall surface 21*b* of the outside base part 23 is disposed opposite to the whole of the outer wall surface 10*a* of the first opening periphery part 10 (FIG. 4). Consequently, the opening periphery part 30 is fitted to a gap between the outer wall surface 10*a* of the first opening periphery part 10 and the inner wall surface 21*b* of the outside base part 23.

For example, the second opening periphery part 20 may not only include the outside base part 23 and the outside thin wall part 24, but may also include an outside tip end part (not illustrated) provided at the side on the opening 20*a* of the second opening periphery part 20 than the outside thin wall part 24. The outside tip end part includes an inner wall surface disposed on the same wall surface as that of the inner wall surface 21*b* of the outside base part 23, in the fitting direction of the first and second fitting members 120 and 130. Consequently, in this case, the outside thin wall part 24 is a portion the inner wall surface of which is dented more than the outside base part 23 and the outside tip end part, and forms the outside concave part 22 that includes the inner wall surface 21*a* dented more than the inner wall surfaces of the outside base part 23 and the outside tip end part, between the outside base part 23 and the outside tip end part.

To provide the outside tip end part on the second opening periphery part 20, for example, the opening periphery part 30 may not only include the inside base part 33 and the inside thin wall part 34, but may also include an inside tip end part (not illustrated) provided at the side on the opening 30*a* of the opening periphery part 30 than the inside thin wall part 34. The inside tip end part includes an outer wall surface disposed on the same wall surface as that of the outer wall surface 31*b* of the inside base part 33, in the fitting direction of the first and second fitting members 120 and 130. Consequently, in this case, the inside thin wall part 34 is a portion the outer wall surface of which is dented more than the inside base part 33 and the inside tip end part, and forms the inside concave part 32 that includes the outer wall surface 31*a* dented more than the outer wall surfaces of the inside base part 33 and the inside tip end part, between the inside base part 33 and the inside tip end part.

In this case, when the first and second fitting members 120 and 130 are being fitted, the inner wall surface of the outside tip end part and the outer wall surface 31*b* of the inside base part 33 are disposed opposite to each other. Moreover, the inner wall surface 21*a* of the outside thin wall part 24 and the outer wall surface 31*a* of the inside thin wall part 34 are disposed opposite to each other. Furthermore, the inner wall surface 21*b* of the outside base part 23 and the outer wall surface of the inside tip end part are disposed opposite to each other.

In this case, in the liquid-proof structure 1, the buffer part 40 is defined between the inner wall surface 21*a* of the outside thin wall part 24 and the outer wall surface 31*a* of the inside thin wall part 34. The buffer part 40 is divided into the area of the outside concave part 22 and the area of the inside concave part 32. Consequently, the volume of the buffer part 40 is the sum of the volume of the outside concave part 22 and the volume of the inside concave part 32.

The gap between the inner wall surface of the outside tip end part and the outer wall surface 31*b* of the inside base part 33 becomes the first clearance part 51 that is narrower than a gap between the inner wall surface 21*a* of the outside thin wall part 24 and the outer wall surface 31*a* of the inside thin wall part 34 (that is, a gap between the inner wall surface 21 of the second opening periphery part 20 and the outer wall surface 31 of the opening periphery part 30 of the buffer part 40). On the other hand, a gap between the inner wall surface 21*b* of the outside base part 23 and the outer wall surface of the inside tip end part becomes the second clearance part 52 that is narrower than the gap between the inner wall surface 21*a* of the outside thin wall part 24 and the outer wall surface 31*a* of the inside thin wall part 34.

In the liquid-proof structure 1, it is possible to suppress the force of liquid entered from the first clearance part 51 by the buffer part 40. Consequently, it is possible to prevent liquid from entering the space (storage chamber in the housing 110) in the fitting body. In the liquid-proof structure 1, the buffer part 40 is defined by the outside concave part 22 on the inner wall surface 21 of the second opening periphery part 20 and the inside concave part 32 on the outer wall surface 31 of the opening periphery part 30. Consequently, it is possible to suppress increase in the size of the first opening periphery part 10, the second opening periphery part 20, and the opening periphery part 30 in the orthogonal direction, with respect to the cylinder axis directions. Moreover, the liquid-proof structure 1 can suppress the liquid the force of which is suppressed by the buffer part 40 from entering the cylindrical space part 133, by the second clearance part 52. From this point also, it is possible to prevent liquid from entering the space (storage chamber in the housing 110) in the fitting body. Even though the liquid-proof structure 1 is formed in this manner, it is possible to suppress increase in the size of the fitting body and enhance the liquid-proof property. However, by forming the second opening periphery part 20 and the opening periphery part 30 as follows, the liquid-proof structure 1 can further suppress increase in the size of the fitting body.

It is assumed that the second opening periphery part 20 is divided into the outside base part 23 and the outside thin wall part 24. Consequently, the outside thin wall part 24 is a portion in which the inner wall surface 21a that is placed at the side on the opening 20a of the second opening periphery part 20 than the outside base part 23 and that is not beyond an opening side end surface 20b (FIG. 2) of the second opening periphery part 20 is dented more than the inner wall surface 21b of the outside base part 23 (FIG. 4). The outside thin wall part 24 forms a first outside concave part 22 serving as the outside concave part 22, and a second outside concave part 25 that is placed at the side on the opening 20a of the second opening periphery part 20 than the first outside concave part 22 and that is not beyond the opening side end surface 20b of the second opening periphery part 20 (FIG. 4). The inner wall surface 21a of the outside thin wall part 24 is divided into an inner wall surface $21a_1$ on which the first outside concave part 22 is placed and an inner wall surface $21a_2$ on which the second outside concave part 25 is placed (FIG. 4). In this example, the inner wall surfaces $21a_1$ and $21a_2$ are disposed on the same wall surface.

On the other hand, the opening periphery part 30 is divided into the inside base part 33 and the inside thin wall part 34. Consequently, the inside thin wall part 34 is a portion in which the outer wall surface 31a that is placed at the side on the opening 30a of the opening periphery part 30 than the inside base part 33 and that is not beyond an opening side end surface 30b (FIG. 1) of the opening periphery part 30 is dented more than the outer wall surface 31b of the inside base part 33 (FIG. 4). The inside thin wall part 34 forms a first inside concave part 32 serving as the inside concave part 32, and a second inside concave part 35 that is placed at the side on the opening 30a of the opening periphery part 30 than the first inside concave part 32 and that is not beyond the opening side end surface 30b of the opening periphery part 30 (FIG. 4). The outer wall surface 31a of the inside thin wall part 34 is divided into an outer wall surface $31a_1$ on which the first inside concave part 32 is placed and an outer wall surface $31a_2$ on which the second inside concave part 35 is placed (FIG. 4). In this example, the outer wall surfaces $31a_1$ and $31a_2$ are disposed on the same wall surface.

When the first and second fitting members 120 and 130 are being fitted, the inner wall surface $21a_2$ placed at the second outside concave part 25 of the outside thin wall part 24 and the outer wall surface 31b of the inside base part 33 are disposed opposite to each other. Moreover, the inner wall surface $21a_1$ placed at the first outside concave part 22 of the outside thin wall part 24 and the outer wall surface $31a_1$ placed at the first inside concave part 32 of the inside thin wall part 34 are disposed opposite to each other. Furthermore, the inner wall surface 21b of the outside base part 23 and the outer wall surface $31a_2$ placed at the second inside concave part 35 of the inside thin wall part 34 are disposed opposite to each other.

In the liquid-proof structure 1, the buffer part 40 is defined between the inner wall surface $21a_1$ of the outside thin wall part 24 and the outer wall surface $31a_1$ of the inside thin wall part 34. The buffer part 40 is a portion in which the area of a part of the first outside concave part 22 and the area of a part of the first inside concave part 32 are overlapped with each other. In other words, compared to the buffer part 40 in the previous example (portion divided into the area of the outside concave part 22 and the area of the inside concave part 32), this buffer part 40 suppresses increase in the size of the first opening periphery part 10, the second opening periphery part 20, and the opening periphery part 30 in the orthogonal direction, with respect to the cylinder axis directions. The volume of the buffer part 40 is smaller than the sum of the volume of the first outside concave part 22 and the volume of the first inside concave part 32.

The gap between the inner wall surface $21a_2$ of the outside thin wall part 24 and the outer wall surface 31b of the inside base part 33 becomes the first clearance part 51 that is narrower than the gap between the inner wall surface $21a_1$ of the outside thin wall part 24 and the outer wall surface $31a_1$ of the inside thin wall part 34 (in other words, the gap between the inner wall surface 21 of the second opening periphery part 20 and the outer wall surface 31 of the opening periphery part 30 of the buffer part 40). On the other hand, the gap between the inner wall surface 21b of the outside base part 23 and the outer wall surface $31a_2$ of the inside thin wall part 34 becomes the second clearance part 52 that is narrower than the gap between the inner wall surface $21a_1$ of the outside thin wall part 24 and the outer wall surface $31a_1$ of the inside thin wall part 34.

The liquid-proof structure 1 can suppress the force of liquid entered from the first clearance part 51 by the buffer part 40. Consequently, it is possible to prevent liquid from entering the space (storage chamber in the housing 110) in the fitting body. As described above, in the liquid-proof structure 1, the buffer part 40 is defined by overlapping the area of a part of the first outside concave part 22 and the area of a part of the first inside concave part 32 to each other. Consequently, the liquid-proof structure 1 can further suppress increase in the size of the first opening periphery part 10, the second opening periphery part 20, and the opening periphery part 30 in the orthogonal direction, with respect to the cylinder axis directions. Moreover, the liquid-proof structure 1 can suppress the liquid the force of which is suppressed by the buffer part 40 from entering the cylindrical space part 133 by the second clearance part 52. From this point also, the liquid-proof structure 1 can prevent liquid from entering the space (storage chamber in the housing 110) in the fitting body. Consequently, the liquid-proof structure 1 has an effect of suppressing increase in the size of the fitting body higher than that of the previous example, and can increase the liquid-proof property as in the previous example.

When the lengths of the outside concave part 22 and the inside concave part 32 in the fitting direction are the same as those of the first outside concave part 22 and the first inside concave part 32 in the fitting direction, the volume of the buffer part 40 in the previous example becomes greater than the volume of the buffer part 40 in this example. Consequently, on the basis of priorities between the increase in volume and the suppression of increase in size, the buffer part 40 of the previous example may be applied when the volume is to be increased, and the buffer part 40 of the present example may be applied when the increase in size is to be suppressed.

In this example, the liquid-proof structure 1 includes a buffer part 60 for suppressing the force of the liquid discharged from the second clearance part 52 (FIG. 4). The buffer part 60 is a space part surrounded by the outer wall surface 10a of the first opening periphery part 10, the inner wall surface 21b of the outside base part 23 of the second opening periphery part 20, the inner wall surface of the coupling wall body 123, and the opening side end surface 30b of the opening periphery part 30. Even when liquid has reached the second clearance part 52, and is discharged from the second clearance part 52, the liquid-proof structure 1 can further suppress the force of the liquid by the second buffer part 60. Consequently, the liquid-proof structure 1 can further prevent liquid from entering the space (storage chamber in the housing 110) in the fitting body via the cylindrical space part 133.

A projection part 125 for abutting the opening side end surface 30b of the opening periphery part 30 is provided on the buffer part 60 in this example. The projection part 125 is projected from the inner wall surface of the coupling wall body 123.

The housing 110 in this example includes a first lock structure 150 for maintaining the fitting state between the first and second fitting members 120 and 130, and a second lock structure 160 for maintaining the fitting state between the second and third fitting members 130 and 140 (FIG. 1 to FIG. 3). The liquid-proof structure 1 is provided at a location excluding where the first lock structure 150 is disposed.

The first lock structure 150 includes an engaged body 151 provided on the first fitting member 120, and an engaging body 152 that is provided on the second fitting member 130, that can insert and extract the engaged body 151 in the insertion/extraction direction opposite to each other, and that can engage the inserted engaged body 151 in the insertion direction and the extraction direction (FIG. 1 to FIG. 3). When the first fitting member 120 and the second fitting member 130 are being fitted, for example, the first lock structure 150 is formed so as to engage the relative movement of the engaged body 151 and the engaging body 152 toward the extraction direction side, by hooking the clips of the engaged body 151 and the engaging body 152 to each other. Moreover, when the first fitting member 120 and the second fitting member 130 are being fitted, for example, the first lock structure 150 is formed so as to engage the relative movement of the engaged body 151 and the engaging body 152 toward the insertion direction side, by abutting the engaged body 151 and the engaging body 152 so as the engaged body 151 will not be inserted further into the engaging body 152.

The second lock structure 160 includes an engaged body 161 provided on the third fitting member 140, and an engaging body 162 that is provided on the second fitting member 130, that can insert and extract the engaged body 161 in the insertion/extraction direction opposite to each other, and that can engage the inserted engaged body 161 in the insertion direction and the extraction direction (FIG. 1 to FIG. 3). When the second fitting member 130 and the third fitting member 140 are being fitted, for example, the second lock structure 160 is formed so as to engage the relative movement of the engaged body 161 and the engaging body 162 toward the extraction direction side, by hooking the clips of the engaged body 161 and the engaging body 162 to each other. Moreover, when the second fitting member 130 and the third fitting member 140 are being fitted, the second lock structure 160 is formed so as to engage the relative movement of the engaged body 161 and the engaging body 162 toward the insertion direction side, by abutting the engaged body 161 and the engaging body 162 so as the engaged body 161 will not be inserted further into the engaging body 162.

As described above, the liquid-proof structure 1 in the present embodiment can suppress increase in the size of the fitting body, and can enhance the liquid-proof property. Moreover, the electrical connection box 100 and the wire harness WH in the present embodiment include the liquid-proof structure 1, and can obtain the same effects as those of the liquid-proof structure 1.

Figure 5:
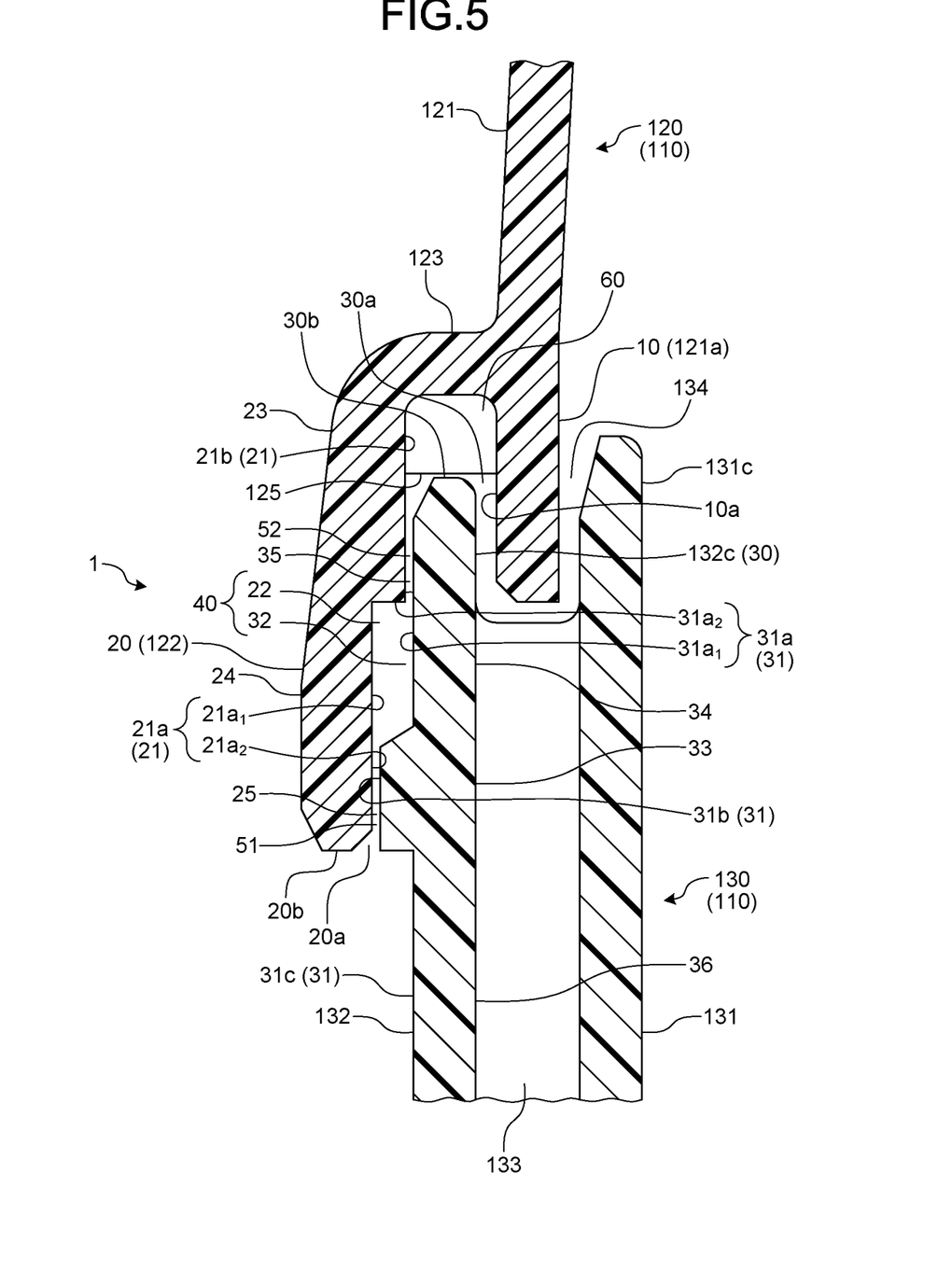
FIG. 5 is a sectional view cut along a line Y-Y in FIG. 3, and a partial enlarged view of the liquid-proof structure.

In the opening periphery part 30, a thin wall part (second inside thin wall part) 36 in which an outer wall surface 31c is dented more than the outer wall surface 31b of the inside base part 33 is provided at a side opposite to the inside thin wall part (first inside thin wall part) 34 interposing the inside base part 33 therebetween. Consequently, the opening periphery part 30 may be formed in a convex shape in which the inside base part 33 is projected more than the outer wall surfaces 31a and 31c of the first inside thin wall part 34 and the second inside thin wall part 36 (FIG. 5). Even when the opening periphery part 30 is formed in this manner, the liquid-proof structure 1, the electrical connection box 100, and the wire harness WH of the present embodiment can obtain the same effects as described above.

The liquid-proof structure of the fitting body according to the present embodiment can suppress the force of the liquid that has entered from the outside of the fitting body by the buffer part. Consequently, the liquid-proof structure of the fitting body can prevent liquid from entering the space in the fitting body. Moreover, the liquid-proof structure can suppress increase in the size of the first opening periphery part, the second opening periphery part, and the opening periphery part in the orthogonal direction, with respect to the cylinder axis directions, because the buffer part is defined by the concave part provided on at least one of the inner wall surface of the second opening periphery part and the outer wall surface of the opening periphery part. In this manner, the liquid-proof structure of the fitting body according to the present embodiment can while suppressing increase in the size of the fitting body, and can enhance the liquid-proof property. Moreover, the electrical connection box and the wire harness according to the present embodiment include the liquid-proof structure, and can obtain the same effects as those of the liquid-proof structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A liquid-proof structure of a fitting body, comprising:
   a first opening periphery part formed on an inside of a first fitting member;
   a second opening periphery part formed on an outside of the first fitting member;
   an opening periphery part of a second fitting member fitted to the first fitting member, the opening periphery part being fitted to a gap between the first opening periphery part and the second opening periphery part; and
   a buffer part defined between an inner wall surface of the second opening periphery part and an outer wall surface of the opening periphery part while the first fitting member and the second fitting member are being fitted, wherein
   the buffer part is a space part defined by a concave part provided on at least one of the inner wall surface of the second opening periphery part and the outer wall surface of the opening periphery part,
   the buffer part is a space part surrounded by an outside concave part provided on the inner wall surface of the second opening periphery part and an inside concave part provided on the outer wall surface of the opening periphery part, and the inside concave part includes a tapered surface portion that is inclined at an angle with respect to a fitting direction of the first fitting member and the second fitting member.

2. The liquid-proof structure of the fitting body according to claim 1, further comprising:
a clearance part narrower than a gap between the inner wall surface of the second opening periphery part and the outer wall surface of the opening periphery part of the buffer part, at a side on an opening of the second opening periphery part than the buffer part between the inner wall surface of the second opening periphery part and the outer wall surface of the opening periphery part.

3. The liquid-proof structure of the fitting body according to claim 1, wherein
the second opening periphery part includes:
an outside base part disposed opposite to a whole or a part of an outer wall surface of the first opening periphery part in a fitting direction of the first and second fitting members; and
an outside thin wall part that forms the outside concave part with an inner wall surface dent more than an inner wall surface of the outside base part at a side on an opening of the second opening periphery part than the outside base part, and
the opening periphery part includes an inside base part and an inside thin wall part that forms the inside concave part with an outer wall surface dent more than an outer wall surface of the inside base part at a side on an opening of the opening periphery part than the inside base part.

4. The liquid-proof structure of the fitting body according to claim 3, wherein
the outside thin wall part is a portion in which an inner wall surface that is placed at the side on the opening of the second opening periphery part than the outside base part and that is not beyond an opening side end surface of the second opening periphery part is dented more than the inner wall surface of the outside base part, and forms: a first outside concave part serving as the outside concave part; and a second outside concave part that is placed at the side on the opening of the second opening periphery part than the first outside concave part and that is not beyond the opening side end surface of the second opening periphery part, and
the inside thin wall part is a portion in which an outer wall surface that is placed at the side on the opening of the opening periphery part than the inside base part and that is not beyond the opening side end surface of the opening periphery part is dented more than the outer wall surface of the inside base part; and forms a first inside concave part serving as the inside concave part and a second inside concave part that is placed at the side on the opening of the opening periphery part than the first inside concave part and that is not beyond the opening side end surface of the opening periphery part.

5. The liquid-proof structure of the fitting body according to claim 4, wherein
when the first and second fitting members are being fitted, an inner wall surface of the second outside concave part of the outside thin wall part and the outer wall surface of the inside base part are disposed opposite to each other, and
in the opening periphery part, by providing a thin wall part in which an outer wall surface is dented more than the outer wall surface of the inside base part at a side opposite to the inside thin wall part interposing the inside base part therebetween, the inside base part is formed in a convex shape projected from the outer wall surfaces of the inside thin wall part and the thin wall part.

6. An electrical connection box, comprising:
a housing that stores therein an electronic component, wherein
the housing includes:
a liquid-proof structure that includes at least one of first and second fitting members fitted to each other and that maintains a liquid-proof property of a fitted portion of the first and second fitting members,
the liquid-proof structure includes:
a first opening periphery part formed on an inside of the first fitting member;
a second opening periphery part formed on an outside of the first fitting member,
an opening periphery part of the second fitting member, being fitted to a gap between the first opening periphery part and the second opening periphery part; and
a buffer part defined between an inner wall surface of the second opening periphery part and an outer wall surface of the opening periphery part while the first fitting member and the second fitting member are being fitted, and
the buffer part is a space part defined by a concave part provided on at least one of
the inner wall surface of the second opening periphery part and the outer wall surface of the opening periphery part,
the buffer part is a space part surrounded by an outside concave part provided on the inner wall surface of the second opening periphery part and an inside concave part provided on the outer wall surface of the opening periphery part, and
the inside concave part includes a tapered surface portion that is inclined at an angle with respect to a fitting direction of the first fitting member and the second fitting member.

7. A wire harness, comprising:
an electronic component;
an electric wire electrically connected to the electronic component; and
a housing that stores therein the electronic component and the electric wire, and from which the electric wire is drawn from inside to outside, wherein
the housing includes a liquid-proof structure that includes at least one of first and second fitting members fitted to each other, and that maintains a liquid-proof property of a fitted portion of the first and second fitting members,
the liquid-proof structure includes:
a first opening periphery part formed on an inside of the first fitting member;
a second opening periphery part formed on an outside of the first fitting member;
an opening periphery part of the second fitting member, being fitted to a gap between the first opening periphery part and the second opening periphery part; and
a buffer part defined between an inner wall surface of the second opening periphery part and an outer wall surface of the opening periphery part while the first fitting member and the second fitting member are being fitted, and the buffer part is a space part defined by a concave part provided on at least one of the inner wall surface of the second opening periphery part and the outer wall surface of the opening periphery part, the buffer part is a space part surrounded by an outside concave part provided on the inner wall surface of the second opening periphery part and an inside concave part provided on the outer wall surface of the opening periphery part, and the inside concave part includes a tapered surface portion that is inclined at an angle with respect to a fitting direction of the first fitting member and the second fitting member.

\* \* \* \* \*